July 19, 1927.
J. W. CALLAHAN ET AL
1,636,498
DEVICE FOR HANDLING HAY AND THE LIKE
Filed Jan. 26, 1924
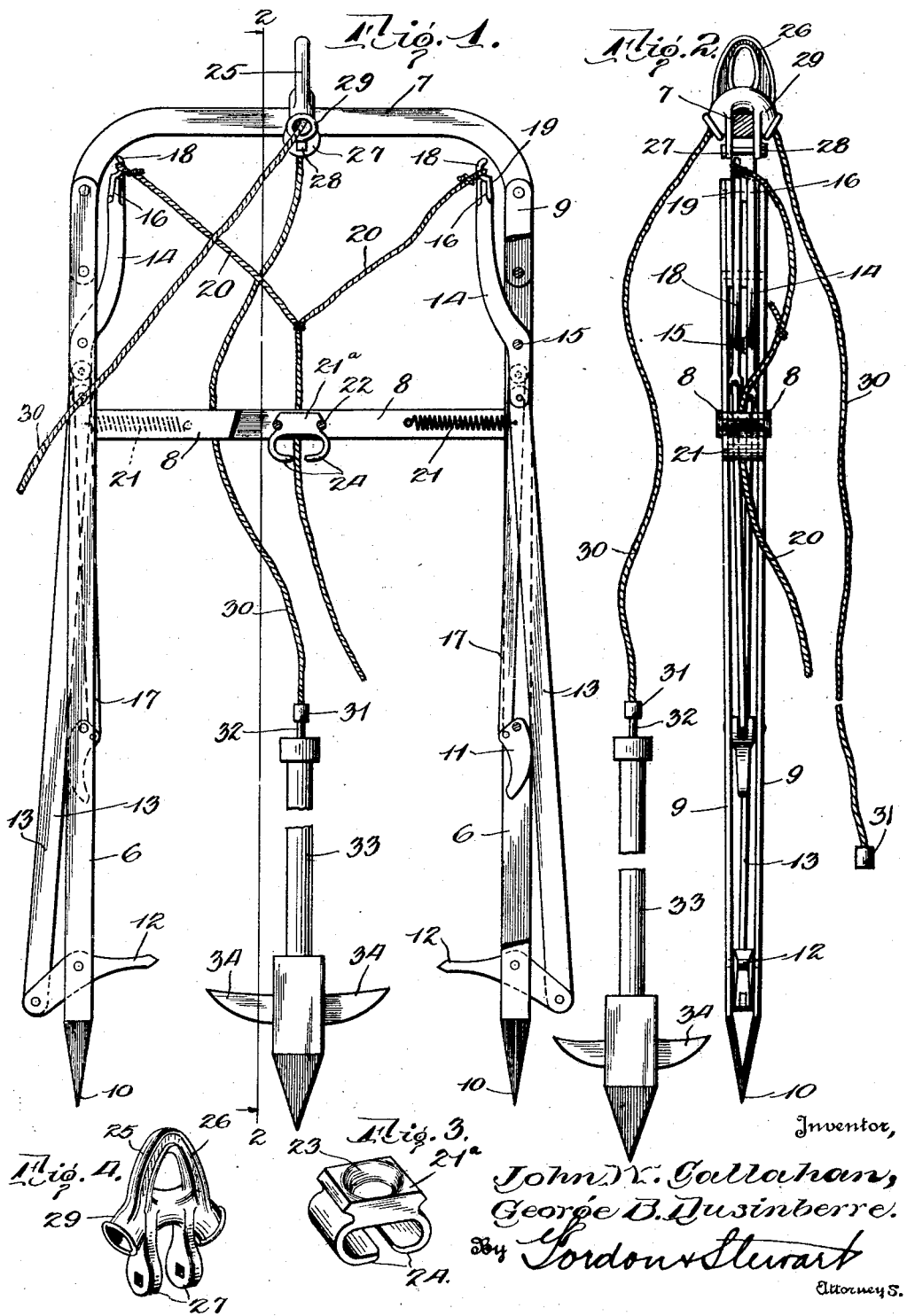
Inventor,
John W. Callahan,
George B. Dusinberre,
By Gordon & Stuart
Attorneys.

Patented July 19, 1927.

1,636,498

UNITED STATES PATENT OFFICE.

JOHN W. CALLAHAN, OF WELLSBORO, PENNSYLVANIA, AND GEORGE B. DUSINBERRE, OF ELMIRA, NEW YORK, ASSIGNORS TO CALLAHAN DISTRIBUTOR COMPANY, INCORPORATED.

DEVICE FOR HANDLING HAY AND THE LIKE.

Application filed January 26, 1924. Serial No. 668,792.

Systems of handling hay or the like have been developed, involving the engagement of a mass of material by means of grapples or hay forks and the subsequent release of the material from the hay fork for transport or delivery along the line of a guide rope or cable which has been inserted through the material as the latter has been engaged by the hay fork. Such a system is the subject matter of Letters Patent No. 1,519,953 granted to John W. Callahan, December 16, 1924.

The present invention relates to improved devices for use in such a system. It is intended broadly to accomplish the threading of the guide rope through the mass of material as the same is engaged and lifted by the hay fork. The guide rope during this operation has one end removably attached to a needle, harpoon or anchor which is held in the material from which the load of the fork is drawn. It is intended that improved and advantageous facilities will be provided by this invention in the hay fork to accomplish the efficient handling of the guide rope and to make possible the use of either end of the guide rope as a connection with the needle, or anchor, during the elevating step. In this way it will be found unnecessary to reeve the rope through the sheave between successive loads of the hay fork.

Another object of our invention is to insure the operation of the trip means of the hay fork free from interference by the load carried and also to restrain the trip operating means from entanglement with the associated devices and in particular the guide rope.

In order clearly to point out the manner in which this invention may be carried out one form of such a device is hereinafter described in this specification and illustrated in the accompanying drawings, in which latter Figure 1 shows a vertical elevation of a hay fork embodying this invention;

Fig. 2 is a vertical section on the line 2—2 of Fig. 1;

Fig. 3 is a perspective view of the rope guide, and

Fig. 4 is a perspective view of the clevis.

By way of example, we have shown our invention as applied to a hay fork of the customary type using a plurality, and in this case, two parallel tines 6, 6 connected at their upper ends by a bow 7. A cross bar formed of two parallel members 8, 8, connects the tines and maintains them parallel. These members 8, 8 are spaced as indicated in Fig. 2, the width of the composite tines, and for purposes as will be apparent from the following description.

The individual tines consist of parallel side plates 9, 9, joined to form a point 10 at the base and at the upper end to be riveted to the outer sides of the bow 7. Between the members 9, 9 are pivoted an upper and lower barb 11 and 12 respectively. The lower barb 12 is connected by means of a link 13 to a bell crank lever 14 which is pivoted on pin 15 running between the tine members 9, 9. The upper free end of the lever 14 has a finger piece 16. The link 13 is normally in the position shown in Fig. 1 with the barb 12 extending horizontally.

The upper barb 11 is connected by means of link 17 to a lever 18 pivoted on the common pivot 15, and extending along lever 14 terminating in an offset portion 19 which engages the finger piece 16 of the latter. The lever 18 has an eye to which an operating rope is attached. When the lever 18 is in a vertical position, as shown in Fig. 1, the barb 11 is withdrawn within the tine. Conversely when the lever 18 is drawn down by the operating rope 20, the barb 11 is extended in horizontal direction. As the lever 18 is drawn down, it forces the finger piece and consequently the lever 14 ahead of it thus drawing the barb 12 within the tine and permitting the lower portion of the load to be released. A spring 21 is attached at one end to the cross bar members 8, 8 and at the other end to link 17, thus insuring the latter staying at its innermost position with the barb in and the lever 14 elevated. The upward movement of the lever 14 carries the lever 18 by reason of the action of the finger piece against the offset portion 19.

Similar barbs and linkages are used in each tine and the levers connected by the branched operating rope 20. This rope is led down through the cross bar 8, 8 and through a guide held between the members 8, 8 by means of rivets or bolts 22.

The rope guide 21ª, as more particularly shown in Fig. 3, consists of a casting having grooves or two offset sides for the reception of the rivets 22 and being provided through its top with a vertical hole or passage, the walls 23 of which are curved to offer a minimum of resistance to the operating rope. Guard members 24 are formed on the lower surface of the casting and take the form of opposed curved flanges, the edges of which are bent in and spaced slightly greater than the width of the rope which it is intended to pass through the opening. These flanges 24, 24 provide a slot transverse of the hay fork and through which the trip rope may readily pass. At the same time the flanges serve as guards to prevent the loose material from getting into the opening of the casting and prevent the ready movement of the rope therethrough.

The clevis 25 is shown in perspective in Fig. 4 and consists of an eye 26 by which the clevis and the attached hay fork may be suspended from a cable or other device. Two depending parallel lugs 27 are provided to extend below member 7 and to be attached thereto by means of bolt 28. An intermediate sheave 29 runs transversely of the clevis and forms a tubular passage for the guide cable 30, as shown in Figs. 1 and 2. A pulley might be used at this point but the tubular passage is the preferred form.

This guide cable is formed with a connector 31 at each end. These connectors are adapted to be readily attached to the central rod 32 of the needle, harpoon or anchor 33. The member 33 has anchoring barbs 34, 34. The connectors 31 are of such size as to serve as stops to prevent the cable 30 from passing through the sheave 29. The needle or anchor 33 is constructed and operates in the manner described in the prior patent above identified and illustrated in Figs. 4 and 8 thereof.

In ordinary operation of this device the hay fork is first arranged with the levers 14 horizontal while the levers 18 are maintained vertical. In this position barbs 11 and 12 are withdrawn into the tines and afford the minimum resistance to the passage of the tines into the hay or other loose inter-laced material which it is intended to transport. By raising the levers 14 into line with levers 18, the lower barbs 12 are brought into horizontal position to hold the mass of material between the barbs and tines. The anchor, harpoon or needle 33 can then be driven manually through the hay to a point beneath the barbs 12 and the central rod 32 lifted to set the barbs 34 horizontal. The stem 33, which is shown in broken lines is of such length as to project above the fork load of material. One connector 31 is attached to the central rod 32.

The fork is now ready to be lifted from around the stem 33 carrying the hay or other material longitudinally along the cable 30. Usually the fork is elevated to a point where the free connector 31 is stopped against the sheave 29, or the lower end connector 31 is removed from rod 32 and drawn taut at a distant point to which it is desired to convey the material from the fork.

The cable 30 then forms a guide means along which a portion of the hay will travel when released by the fork. This releasing movement is accomplished by drawing down the trip rope 20 which overcomes springs 21. Barbs 11 are therefore forced into the material to hold the upper portion while the lower portion is released from the grasp of barbs 12 and travels along the guide formed by cable 30.

After the trip rope is released, the weight of the material on the barbs 11 will assist the springs 21 in lowering the barbs and thus release this second portion of material for conveyance along the cable guide 30.

The empty fork is now lowered and driven into the hay, the anchor or needle 33 is placed in position as before and a second load engaged by the fork. The free end or connector 31 of the cable 30 which had come to rest against the sheave 29 is then connected to the central rod 32 of the needle 33 and the operation of elevating and conveying the fork load of material repeated.

During these operations the guards 24 insure the rope 20 against becoming jammed on the eyelet 23 and permit the rope to be transferred from one side to the other of the hay fork without hindrance.

The use of a double ended cable 30 with a sheave 29 in the clevis enables greater speed and efficiency in threading the successive loads on the cable and setting the latter and the subsequent transport of the load as it is released.

It is not necessary that the device include a fork specifically as other analogous material-holding means such as rope slings may be used. It is only essential that the novel relationship of sheave, clevis, guide rope and needle be present. While one preferred form of our invention has been described in detail, nevertheless it is to be understood that the scope of the invention is not limited, except as indicated in the appended claims.

What we claim is:

1. In combination with a hay-fork, means for suspending the hay-fork, a guide cable slidable through the suspending means and a device for threading the guide cable through the material engaged by the hay-fork.

2. In combination with a hay-fork, a clevis having a sheave, a guide cable slidable through the sheave and a device attachable to and adapted to thread either end of the cable through the material engaged by the hay-fork.

3. In combination with a hay-fork, a clevis having an arcuate transverse sheave, a guide cable slidable through the sheave and a device attachable to and adapted to thread either end of the cable through the material engaged by the hay-fork.

4. In combination with a hay-fork, a clevis having an eye, depending lugs for attachment to the bow of the hay-fork, and a sheave intermediate said eye and said lugs.

5. In combination with a hay-fork, a clevis having an eye, depending parallel lugs for attachment to the bow of the hay-fork, and a transverse arcuate sheave intermediate said eye and said lugs.

6. A clevis adapted for removable attachment to the bow of a hay-fork, and having a sheave incorporated therein adapted to receive a guide rope.

7. In combination with a hay-fork having trip means for engaging the load, a rope guide on said hay-fork, said rope guide having a top portion formed with an opening for the trip operating rope, a middle portion of less width than the top portion and curved guards extending laterally of and parallel to the face of the rope guide, and forming in connection with same top portion and middle portion, grooves for the reception of attachment members.

8. In combination with a hay-fork including a sheave, a guide cable slidable through said sheave, a connector at each end of said cable and means attachable to either of said connectors and adapted to pass through the material engaged by the hay-fork.

9. In combination, a guide rope adapted for guiding interlaced material through which it is threaded, said guide rope having connectors at each end, a sheave, hoisting means carrying said sheave, said sheave permitting the passage therethrough of the guide rope but not the connectors.

10. In combination, a guide rope adapted for guiding interlaced material through which it is threaded, a sheave, hoisting means carrying said sheave, said sheave permitting the passage therethrough of the guide rope and stops on each end of the guide rope adapted to anchor either end of said guide rope at the sheave.

In testimony whereof, we have hereunto affixed our signatures.

JOHN W. CALLAHAN.
GEORGE B. DUSINBERRE.